United States Patent [19]

Moore, Jr.

[11] Patent Number: 5,189,074
[45] Date of Patent: Feb. 23, 1993

[54] TERTIARY ETHERS AS BLOWING AGENTS FOR POLYURETHANE FOAMS

[75] Inventor: H. Dean Moore, Jr., Downingtown, Pa.

[73] Assignee: ARCO Chemical Technology, L.P., Wilmington, Del.

[21] Appl. No.: 809,692

[22] Filed: Dec. 17, 1991

[51] Int. Cl.⁵ ............................................... C08J 9/14
[52] U.S. Cl. ..................................................... 521/114
[58] Field of Search ................................ 521/114, 155

[56] References Cited

U.S. PATENT DOCUMENTS

| | | |
|---|---|---|
| 4,535,096 | 8/1985 | Jacobs ................................. 521/114 |
| 4,546,122 | 10/1985 | Radovich et al. .................. 521/164 |
| 4,596,836 | 6/1986 | Kimball et al. ..................... 521/117 |
| 4,636,529 | 1/1987 | Crooker .............................. 521/131 |
| 4,751,253 | 6/1988 | Tylenda .............................. 521/114 |
| 4,764,541 | 8/1988 | Brasington et al. ................. 521/114 |
| 4,785,027 | 11/1988 | Brasington et al. ................. 521/131 |
| 5,019,602 | 5/1991 | Lowe .................................. 521/114 |
| 5,075,346 | 12/1991 | Sonnenberg et al. .............. 521/114 |
| 5,082,868 | 1/1992 | Burkhart et al. ................... 521/114 |

*Primary Examiner*—Morton Foelak
*Attorney, Agent, or Firm*—Jonathan L. Schuchardt

[57] ABSTRACT

Tertiary aliphatic ethers are excellent blowing agents for the production of polyurethane foams, and can be used as replacements for CFCs, HCFCs, methylene chloride, and other known blowing agents without sacrificing good physical properties.

14 Claims, No Drawings

TERTIARY ETHERS AS BLOWING AGENTS FOR POLYURETHANE FOAMS

FIELD OF THE INVENTION

The invention relates to the production of polyurethane foams. Methyl tert-butyl ether, a commonly used octane enhancer for gasoline, and other tertiary aliphatic ethers are useful blowing agents for making flexible, semi-rigid, and rigid foamed polyurethanes.

BACKGROUND OF THE INVENTION

Foaming agents, or blowing agents, are widely used in the polyurethane industry. Although many compounds have been proposed as suitable blowing agents for polyurethane manufacture, relatively few of these are commonly used. The most widely used blowing agents have been freon (CFC-11, a chlorofluorocarbon) and dichloromethane (methylene chloride). Although freon and dichloromethane are excellent blowing agents for various polyurethane applications, there is great interest in finding replacements. CFCs are harmful to the earth's upper ozone layer, so production of these is being phased out worldwide. A small portion of the market now uses HCFCs or water instead of CFCs. Unfortunately, HCFCs are expensive and still contribute to ozone depletion. Polyurethane foams blown only with water have been developed, but good physical properties and low densities are often difficult to achieve without an auxiliary blowing agent. Formulators concerned about the toxicity of methylene chloride continue to search for satisfactory alternatives.

Diethyl ether has been listed as a blowing agent for polyurethane foams (see, for example, U.S. Pat. Nos. 4,546,122 and 4,764,541), but actual examples of foams made with diethyl ether are hard to find. The flammability of diethyl ether and its high volatility have probably dissuaded those skilled in the art from actually using it.

Tertiary aliphatic ethers such as methyl tert-butyl ether (MTBE) and tert-amyl methyl ether (TAME) are industrially important as an octane enhancers for gasoline. Tertiary ethers have not been previously shown to be effective blowing agents for polyurethane foams.

SUMMARY OF THE INVENTION

The invention is a process for making a polyurethane foam. In the process, a polyol, a polyisocyanate, and water react in the presence of a surfactant, catalyst and blowing agent to produce a foam. A tertiary aliphatic ether is used as the blowing agent. Tertiary aliphatic ethers are attractive alternatives to conventional blowing agents because of their relatively low cost, adequate volatility, and low potential for ozone depletion. Surprisingly, the overall physical properties of polyurethane foams made using tertiary aliphatic ethers as blowing agents are as good as or better than the properties of foams made using HCFCs or diethyl ether.

DETAILED DESCRIPTION OF THE INVENTION

Tertiary aliphatic ethers can be used as blowing agents for making a wide variety of cellular polyurethane products, including flexible foams, semi-rigid foams, rigid foams, and microcellular elastomer foams. As is well-known to those skilled in the art, each of these types of formulations employs different types of polyisocyanates, polyols, and additives depending on the desired foam densities and required physical properties for the specific end use.

Tertiary aliphatic ethers useful in the process of the invention are preferably $C_4$ and $C_5$ tertiary alkyl ethers of methanol and ethanol. Examples of suitable tertiary ethers include methyl tert-butyl ether (MTBE), ethyl tert-butyl ether (ETBE), methyl tert-amyl ether (TAME), ethyl tert-amyl ether, and the like, and mixtures thereof. Other conventional blowing agents may be used in combination with the tertiary aliphatic ethers.

The polyisocyanates that can be used in the process of the invention are aromatic and aliphatic compounds that have two or more -NCO groups. Examples include, but are not limited to, toluene diisocyanates (TDI), methylene diphenylene diisocyanates (MDI), polymeric MDIs, cyclohexane diisocyanates (CHDI), hexamethylene diisocyanates, isophorone diisocyanates, and the like, and mixtures thereof.

Any polyol known for use in polyurethane foams may be used. Examples include, but are not limited to, polyoxyalkylene polyols, polymer polyols (PHD, PIPA, styrene-acrylonitrile, and the like), polytetramethylene ether glycols, sucrose-amine polyols, polyester polyols, polyacetals, polycarbonates, and the like, and mixtures thereof. Other polyfunctional active hydrogen-containing compounds, such as amine-terminated polyethers, ethylene diamine, and the like, can also be used. The polyols will typically have from 2-8 functional groups per molecule and molecular weights from about 150 to about 50,000. The most suitable polyol or polyols for any given application will obviously depend greatly upon the desired physical properties.

Water is used in the process of the invention. Water reacts with free isocyanate groups, generating carbon dioxide and amines. The amine groups react with other isocyanate groups to give urea linkages. The amount of water used is adjusted to give the desired amount of carbon dioxide (which functions as the primary or as an auxiliary blowing agent) and urea groups. Typically, the amount of water used will be within the range of about 1 to about 20 weight percent based on the amount of polyol used.

The surfactants and catalysts useful in the invention are those routinely used by those skilled in the art of polyurethane foam manufacture. The choice of a particular surfactant will depend greatly on the specific application. The catalysts useful in the invention also depend on the formulation. Generally useful catalysts include tertiary amines, tertiary amines that contain amide groups or isocyanate-reactive hydrogen atoms, alkali metal hydroxides and alkoxides, organometallic compounds (especially organotin compounds), and the like, and mixtures thereof. It is common to use more than one type of catalyst in any given formulation to adjust the rates of various reactions taking place during foaming.

Other additives are optionally used in the process of the invention. These additives, which are well known to those skilled in the art, are added for a variety of different reasons. Such additives include, but are not limited to, fillers, flame retardants, plasticizers, chain extenders, crosslinkers, dyes, cell openers, inhibitors, fungicides, and the like.

The process of the invention is performed using techniques well known in the art. If desired, for example, a one-shot process in which all of the reactants are combined in a single step can be employed. A prepolymer process can also be used.

The following examples merely illustrate the invention. Those skilled in the art will recognize numerous variations that are within the spirit of the invention and scope of the claims.

The following products are used to prepare the polyurethane foams of the examples:

Polyols

1. "ARCOL 6018" polyol: a sorbitol/glycerin polyether polyol blend; hydroxyl #445; product of ARCO Chemical Company
2. "ARCOL 2025" polyol: polyether diol based on PO; hydroxyl #56; product of ARCO Chemical Company
3. "ARCOL PPG-425" polyol: polyether diol based on PO; hydroxyl #265.
4. "ARCOL HPP-520" polyol: aromatic amine polyol; hydroxyl #520; product of ARCO Chemical Company
5. "Thanol SF-265" polyol: triethanolamine propoxylate; hydroxyl #635; product of Eastman Chemical Company
6. "Terol 351-I" polyol: polyester polyol; hydroxyl #350; product of Oxid, Inc.

Polyisocyanate

1. "Mondur MR" polyisocyanate: polymeric MDI; product of Mobay

Catalysts

1. "Niax A-1" catalyst: tertiary amine catalyst; product of Union Carbide
2. "DABCO TMR-30" catalyst: phenol-formaldehyde based tertiary amine catalyst; product of Air Products
3. "Polycat 8" catalyst: dimethylcyclohexylamine; product of Air Products
4. "Hexchem 977" catalyst: potassium octoate solution; product of Mooney Chemical, Inc.

Surfactant

1. "DC-193" surfactant; silicone surfactant; product of Dow Corning

Flame retardant

1. "Antiblaze 80" flame retardant; product of Albright/Wilson

Blowing agents

1. "HCFC 141b" blowing agent; hydrogen-containing chlorofluorocarbon; product of Allied-Signal.
2. Methyl tert-butyl ether; "MTBE"; product of ARCO Chemical Company
3. Diethyl ether; obtained from J. T. Baker

EXAMPLES 1-9

Preparation of Rigid Polyurethane Foams using MTBE, Diethyl Ether, and HCFC-141b as Blowing Agents Box-pour foams (12"×8"×8", free-rise) are prepared. The B-side components (polyols, catalyst, surfactant, blowing agent, water) are premixed for 30 seconds at 2200 rpm. The isocyanate is then added, and the mixture is mixed for 30 seconds at 2200 rpm. The mixture is poured into a polyethylene-lined mold. After a 24-hour curing period, test specimens are cut from the center of the buns. Results from physical testing of the samples are summarized in Tables 1-3.

As shown in Tables 1 and 2, the physical properties of the polyether-based MTBE-blown foams (Examples 1 and 4) are generally about equal to those of the HCFC-blown foams (Examples C3 and C6), and are substantially better than those of the diethyl ether-blown foams (C2 and C5). As shown in Table 1, compressive strength improves 42% in the parallel direction and 68% in the perpendicular direction when MTBE is used in place of diethyl ether (Compare Examples 1 and C2). The same effect is apparent with a different polyether-based formulation (see Table 2, Examples 4 and C5). Compressive strength increases 25% (parallel) and 68% (perpendicular) when MTBE is used vs. diethyl ether.

The improvements in compressive strength with MTBE are also seen in the less-sensitive polyester foam formulation (Table 3). Increases are 12% (parallel) and 28% (perpendicular) compared with diethyl ether, and 7% (parallel) and 50% (perpendicular) compared with the HCFC blowing agent.

TABLE 1

| RIGID POLYURETHANE FOAM-POLYETHER POLYOLS | | | |
|---|---|---|---|
| Example # | 1 | C2* | C3* |
| Formulation (pbw) | | | |
| "ARCOL 6018" polyether polyol | 29.4 | 28.2 | 32.1 |
| "ARCOL 2025" polyether polyol | 3.6 | 3.5 | 3.96 |
| Water | 1.1 | 1.0 | 1.2 |
| "Niax A-1" catalyst | 0.2 | 0.1 | 0.1 |
| "Polycat 8" catalyst | 0.5 | 0.5 | 0.6 |
| "DC-193" surfactant | 0.33 | 0.32 | 0.37 |
| HCFC 141b | 0 | 0 | 2.0 |
| Diethyl ether | 0 | 2.0 | 0 |
| Methyl tert-butyl ether | 2.0 | 0 | 0 |
| "Mondur MR" polyisocyanate | 55.9 | 55.9 | 55.9 |
| Physical Properties | | | |
| Density (pcf)[1] | 1.96 | 1.90 | 2.01 |
| Compressive strength (psi), 10% deform[2] | | | |
| Parallel | 22.8 | 16.1 | 21.3 |
| Perpendicular | 12.3 | 7.3 | 12.2 |

*Comparative examples
[1]ASTM method D-1622
[2]ASTM method D-1621

TABLE 2

| RIGID POLYURETHANE FOAM-POLYETHER POLYOLS | | | |
|---|---|---|---|
| Example # | 4 | C5* | C6* |
| Formulation (pbw) | | | |
| "ARCOL PPG-425" polyol | 5.87 | 5.87 | 5.87 |
| "ARCOL HPP-520" | 23.5 | 23.5 | 23.5 |
| "Thanol SF-265" polyol | 1.55 | 1.55 | 1.55 |
| Water | 0.61 | 0.61 | 0.61 |
| "Polycat 8" catalyst | 0.76 | 0.76 | 0.76 |
| "DC-193" surfactant | 0.46 | 0.46 | 0.46 |
| "Antiblaze 80" flame retardant | 4.65 | 4.65 | 4.65 |
| HCFC 141b | 0 | 0 | 5.23 |
| Diethyl ether | 0 | 2.50 | 0 |
| Methyl tert-butyl ether | 2.98 | 0 | 0 |
| "Mondur MR" polyisocyanate | 51.3 | 51.3 | 51.3 |
| Physical Properties | | | |
| Density (pcf)[1] | | | |
| Parallel | 1.89 | 1.80 | 1.91 |
| Perpendicular | 2.03 | 1.96 | 2.06 |
| Compressive strength (psi), 10% deform[2] | | | |
| Parallel | 27.8 | 22.2 | 28.6 |
| Perpendicular | 12.7 | 7.53 | 12.4 |

*Comparative examples
[1]ASTM method D-1622
[2]ASTM method D-1621

TABLE 3

RIGID POLYURETHANE FOAMS-POLYESTER POLYOL

| Example # | 7 | C8* | C9* |
|---|---|---|---|
| Formulation (pbw) | | | |
| "Terol 351-I" polyester polyol | 25.0 | 25.0 | 25.0 |
| Water | 0.43 | 0.42 | 0.43 |
| "Hexchem 977" base catalyst | 0.68 | 0.68 | 0.68 |
| "DABCO TMR-30" catalyst | 0.22 | 0.22 | 0.22 |
| "DC-193" surfactant | 0.50 | 0.50 | 0.50 |
| HCFC 141b6 | 0 | 0 | 3.72 |
| Diethyl ether | 0 | 1.73 | 0 |
| Methyl tert-butyl ether | 2.12 | 0 | 0 |
| "Mondur MR" polyisocyanate | 54.2 | 52.2 | 52.4 |
| Physical Properties | | | |
| Density (pcf)[1] | | | |
| Parallel | 2.21 | 2.18 | 1.99 |
| Perpendicular | 2.28 | 2.31 | 2.11 |
| Compressive strength (psi), 10% deform[2] | | | |
| Parallel | 42.5 | 37.9 | 39.6 |
| Perpendicular | 15.4 | 12.0 | 10.3 |

*Comparative examples
[1] ASTM method D-1622
[2] ASTM method D-1621

I claim:

1. A process for producing a polyurethane foam, said process comprising reacting a polyol, a polyisocyanate, and water in the presence of a surfactant, a catalyst, and a blowing agent, wherein said blowing agent is a tertiary aliphatic ether.

2. The process of claim 1 wherein the polyurethane foam is a rigid foam.

3. The process of claim 1 wherein the polyurethane foam is a semi-rigid foam.

4. The process of claim 1 wherein the polyurethane foam is a flexible foam.

5. The process of claim 1 wherein the polyisocyanate is selected from the group consisting of toluene diisocyanate, methylene diphenylene diisocyanate, polymeric MDIs, and mixtures thereof.

6. The process of claim 1 wherein the tertiary aliphatic ether is selected from the group consisting of methyl tert-butyl ether, ethyl tert-butyl ether, methyl tert-amyl ether, ethyl tert-amyl ether, and mixtures thereof.

7. A process for producing a rigid polyurethane foam, said process comprising reacting a polyol, a polyisocyanate, and water in the presence of a surfactant, a catalyst, and a blowing agent, wherein said blowing agent is a tertiary aliphatic ether.

8. The process of claim 7 wherein the polyisocyanate is selected from the group consisting of toluene diisocyanate, methylene diphenylene diisocyanate, polymeric MDIs, and mixtures thereof.

9. The process of claim 7 wherein the tertiary aliphatic ether is selected from the group consisting of methyl tert-butyl ether, ethyl tert-butyl ether, methyl tert-amyl ether, ethyl tert-amyl ether, and mixtures thereof.

10. The process of claim 9 wherein the tertiary aliphatic ether is methyl tert-butyl ether.

11. A process for producing a flexible polyurethane foam, said process comprising reacting a polyol, a polyisocyanate, and water in the presence of a surfactant, a catalyst, and a blowing agent, wherein the blowing agent is a tertiary aliphatic ether.

12. The process of claim 11 wherein the polyisocyanate is selected from the group consisting of toluene diisocyanate, methylene diphenylene diisocyanate, polymeric MDIs, and mixtures thereof.

13. The process of claim 11 wherein the tertiary aliphatic ether is selected from the group consisting of methyl tert-butyl ether, ethyl tert-butyl ether, methyl tert-amyl ether, ethyl tert-amyl ether, and mixtures thereof.

14. The process of claim 13 wherein the tertiary aliphatic ether is methyl tert-butyl ether.

* * * * *